US 6,588,235 B2

(12) United States Patent
Trentelman et al.

(10) Patent No.: US 6,588,235 B2
(45) Date of Patent: Jul. 8, 2003

(54) METHOD OF CENTERING A FIBER CORE IN A MULTIPLE-CRUCIBLE METHOD

(75) Inventors: Jackson P. Trentelman, Lawrenceville, PA (US); James G. Anderson, Dundee, NY (US); Ernest E. Brand, Corning, NY (US)

(73) Assignee: Corning Incorporated, Corning, NY (US)

( * ) Notice: Subject to any disclaimer, the term of this patent is extended or adjusted under 35 U.S.C. 154(b) by 78 days.

(21) Appl. No.: 09/943,250

(22) Filed: Aug. 30, 2001

(65) Prior Publication Data

US 2003/0044143 A1 Mar. 6, 2003

(51) Int. Cl.[7] .............................................. C03B 37/022
(52) U.S. Cl. .............................. 65/377; 65/403; 65/437; 65/497
(58) Field of Search .......................... 65/403, 437, 497, 65/347

(56) References Cited

U.S. PATENT DOCUMENTS

| | | | |
|---|---|---|---|
| 3,957,342 A | 5/1976 | Newns et al. ................. 350/96 |
| 3,999,835 A | 12/1976 | Newns et al. ................. 350/96 |
| 4,023,952 A | 5/1977 | Newns et al. ................. 65/32 |
| 4,046,537 A | * 9/1977 | Deserno et al. ............... 65/403 |
| 4,101,305 A | 7/1978 | Midwinter et al. ............ 65/145 |
| 4,118,212 A | 10/1978 | Aulich et al. .................... 65/3 |
| 4,125,200 A | 11/1978 | Manley ....................... 215/246 |
| 4,131,447 A | * 12/1978 | Aulich et al. .................. 65/325 |
| 4,133,664 A | * 1/1979 | Aulich et al. .................. 65/405 |
| 4,145,200 A | 3/1979 | Yamazaki et al. ............... 65/2 |
| 4,217,123 A | 8/1980 | Titchmarsh ...................... 65/3 |
| 4,259,100 A | 3/1981 | Aulich et al. ................... 65/11 |
| 4,274,854 A | * 6/1981 | Pleibel et al. ................. 65/403 |
| 4,275,951 A | 6/1981 | Beales et al. ............. 350/96.31 |
| 4,277,270 A | 7/1981 | Krohn ............................. 65/3 |
| 4,289,516 A | 9/1981 | Krohn ............................. 65/3 |
| 4,308,045 A | 12/1981 | Miller ........................ 65/3.11 |
| 4,326,869 A | 4/1982 | Kurosaki et al. ............. 65/3.14 |
| 4,351,659 A | 9/1982 | Beales et al. ................ 65/3.13 |
| 4,372,645 A | 2/1983 | Miller ........................ 350/96.3 |
| 4,372,767 A | 2/1983 | Maklad ...................... 65/3.12 |
| 4,385,916 A | * 5/1983 | Jochem ........................ 65/403 |
| 4,407,667 A | 10/1983 | Le Noane et al. ............ 65/3.11 |
| 4,452,508 A | 6/1984 | Beales et al. ............. 350/96.31 |
| 4,466,818 A | 8/1984 | Brongersma ................. 65/3.13 |
| 4,729,777 A | 3/1988 | Mimura et al. .............. 65/3.13 |
| 4,768,859 A | 9/1988 | Kasori et al. ............. 350/96.34 |
| 4,784,679 A | * 11/1988 | Lentz .......................... 65/403 |
| 4,897,100 A | 1/1990 | Nice ......................... 65/3.13 |
| 4,911,895 A | 3/1990 | Kida et al. .................. 422/245 |

(List continued on next page.)

FOREIGN PATENT DOCUMENTS

| | | | |
|---|---|---|---|
| CA | 1156467 | 11/1983 | |
| GB | 1448080 | 9/1976 | |
| GB | 2 057 161 | 9/1978 | ............ G02B/5/14 |
| WO | 99/51537 | 10/1999 | |
| WO | WO 02/20418 | 3/2002 | ............ C03B/37/02 |

OTHER PUBLICATIONS

J.E. Midwinter et al, "Fiber Pulling by Double–Crucible Apparatus", *Optical Fibers for Transmission*, pp 167–179.

*Primary Examiner*—John Hoffmann
(74) *Attorney, Agent, or Firm*—Timothy R. Krogh; Kevin M. Able

(57) ABSTRACT

The invention relates to a method of making an optical fiber and an optical fiber made in accordance with the inventive method. The method includes the step of drawing an optical fiber from a multiple crucible apparatus, wherein one of the crucibles of the apparatus has a non-symmetrical orifice (not shown). The inventive fiber has at least a core and cladding. At least one section of the inventive fiber includes an orientation element.

24 Claims, 3 Drawing Sheets

U.S. PATENT DOCUMENTS

| | | | |
|---|---|---|---|
| 4,950,047 A | 8/1990 | Berkey et al. | 350/96.23 |
| 5,069,741 A | 12/1991 | Kida et al. | 156/617.1 |
| 5,081,076 A | 1/1992 | Rapp | 501/40 |
| 5,100,449 A | 3/1992 | Cornelius et al. | 65/2 |
| 5,106,400 A | 4/1992 | Tick | 65/3.11 |
| 5,149,349 A | 9/1992 | Berkey et al. | 65/3.11 |
| 5,161,050 A | 11/1992 | Grasso et al. | 359/341 |
| 5,609,665 A | 3/1997 | Bruce et al. | 65/379 |
| 5,776,223 A | 7/1998 | Huang | 65/437 |
| 5,879,426 A | 3/1999 | Sanghera et al. | 65/405 |
| 6,250,112 B1 | 6/2001 | Kerdoncuff | 65/379 |

* cited by examiner

METHOD OF CENTERING A FIBER CORE IN A MULTIPLE-CRUCIBLE METHOD

BACKGROUND OF THE INVENTION

1. Field of the Invention

The present invention relates generally to optical fiber (hereinafter "fiber") and more particularly to a multiple crucible method of making fiber.

2. Technical Background

The most widely known multiple crucible method of drawing fiber is the double crucible method. The double crucible method of making fiber has been known for at least the last two or three decades, and is disclosed for example in *Optical Fibers for Transmission*, New York John Wiley, pp. 166–178 (Midwinter, 1979).

Much of the early work in the area of drawing multimode fiber by double crucible exploited the natural tendency of the fiber core and cladding to diffuse (mix). This type of fiber is typically characterized as a fiber with a large core relative to the cladding and a less than step function refractive index change at the interface of the core and cladding (hereinafter multimode fiber). Later work in this area was directed toward creating a parabolic index profile in the multimode fiber. This was accomplished by controlling the diffusion between the core and the cladding.

In the case of making single mode fiber from a double crucible, the challenge of limiting diffusion is much greater for at least the reason that the core of a single mode fiber is much smaller than the core of a multimode fiber. Typical core size of a single mode fiber is 3–6 microns. Thus a diffusion depth of 1 micron may affect a significant portion of the core of a single mode fiber.

Prior attempts to limit diffusion in a single mode fiber have been made in the rod-in-tube method of manufacturing fiber. This method requires the use of distinct portions of core and cladding material. The distinct portions of core material are inserted into the cladding material. This assembly is then consolidated and drawn at a high viscosity. This method suffers from interfacial contamination, increased fiber attenuation, and additional thermal histories being imposed on the glass. The application of additional thermal history is especially harmful to types of glasses that are prone to devitrification.

In addition to diffusion, another problem with drawing fiber from a multiple crucible apparatus is the ability to achieve core clad concentricity. Prior uses of a multiple crucible apparatus teach the crucibles in a fixed orientation to each other. Fixing the crucibles creates a geometry when the crucible hardware is setup and it is hoped that this geometry is maintained once the apparatus is heated to an operating temperature. Consistently, the geometry will change and the resulting fiber will not have a concentric core cladding geometry.

Thus, there is a need in the art to be able to quickly adjust the geometry of the core and cladding of the fiber and to draw a fiber with a core aligned concentrically in a cladding.

SUMMARY OF THE INVENTION

The present invention relates to a method of making an optical fiber drawn from a multiple crucible apparatus. Preferably one of the crucibles of the multiple crucible apparatus has a tip with an orifice, wherein the orifice has a non-symmetrical radial axis.

One embodiment of the invention includes a method of making an optical fiber from a multiple crucible apparatus. The method includes (a) documenting the location in space of an alignment element of an orifice of at least one of the crucibles of the multiple crucible apparatus; (b) drawing an optical fiber from the multiple crucible; (c) documenting a location of a first portion of the drawn fiber with respect to a second portion of the drawn fiber, the second portion of the drawn fiber having an orientation element; (d) moving the a crucible containing the raw materials for the first portion of the drawn fiber relative to the crucible having alignment element; and (e) repeating steps (b)–(d) until a location of the first portion comprises a pre-determined location relative to the second portion having the orientation element.

A second embodiment of the invention also includes a method of making an optical fiber from a multiple crucible. The second method includes (a) drawing an optical fiber from a multiple crucible apparatus wherein one of the crucibles of the apparatus has a circumferential orientation element; (b) documenting a location of a first portion of the drawn fiber; (c) moving a location of a second crucible of the apparatus relative to the crucible having the circumferential orientation element; and (d) repeating steps (a)–(c) until the first portion of the fiber is located at a pre-determined location.

A third embodiment of the invention further includes a method of making an optical fiber. The third method includes (a) drawing an optical fiber from a multiple crucible apparatus wherein one of the crucibles of the apparatus has an orifice having a notch; (b) documenting a location of a first portion of the drawn fiber; (c) moving a location of a crucible for the first portion of the fiber of the apparatus relative to the crucible having the notch; and (d) repeating steps (a)–(c) until the core of the fiber is located at a predetermined location.

A fourth embodiment of the invention further includes a method of making an optical fiber. The fourth method includes drawing an optical fiber from a multiple crucible apparatus, wherein one of the crucibles of the apparatus has a non-symmetrical orifice.

The invention also includes an unique optical fiber. The inventive fiber has a core and a cladding surrounding said core, wherein at least one of said core or said cladding comprises an asymmetrical feature.

One advantage that will result from practicing the invention is that a fiber made in accordance with the invention will have an orientation element. The orientation element provides a reference point to orient any section of the fiber, e.g. a core, an interior cladding, or an exterior cladding. The use of the reference point to orient the section of the fiber will reduce the number of crucible geometry adjustments to locate the section of the fiber to a predetermined point of the fiber, e.g. the center of the fiber. The invention may be used to reduce the amount of time and cost associated with draw apparatus reaching a steady state for drawing useable fiber. The orientation element also provides a reference point to determine a positive and negative direction for both the x and y axes for a Cartesian set of reference points interposed on a cross section of the fiber.

Another advantage that will result from practicing the invention is that the core of the fiber can be aligned concentrically to the exterior of the fiber. Furthermore, practicing the invention will result in any two sections, up to all of the sections, of the fiber being concentrically aligned to each other.

All of the above methods include the advantage of being applicable to both soft and hard glasses. The above methods also have in common at least one more advantage, that the methods may be easily incorporated into existing fiber draw equipment.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Reference will now be made in detail to the present preferred embodiments of the invention, examples of which are illustrated in the accompanying drawings. Wherever possible, the same reference numbers will be used throughout the drawings to refer to the same or like parts.

Figure 1:
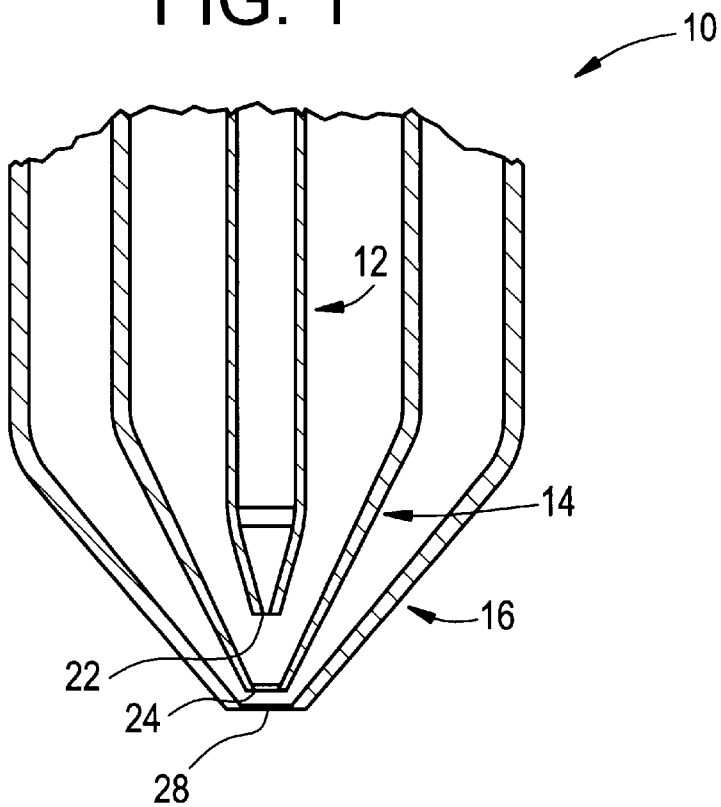
FIG. 1 is a partial schematic cross sectional view of an apparatus which may be used to practice the present invention.

An exemplary embodiment of a multiple crucible draw apparatus which may be used to practice the present invention is shown in FIG. 1, and is designated generally throughout by reference numeral 10. Illustrated in FIG. 1 is a multiple crucible apparatus in the form of a triple crucible draw apparatus. The present invention is applicable to any and all multiple crucible draw processes. For example the invention is equally applicable to a double crucible apparatus or a quad crucible apparatus. One factor in determining a preferable number of crucibles is the number of distinct layers of glass required in the fiber. For example, for a fiber with a simple step index core and a cladding a double crucible draw apparatus may be preferred. For a fiber with a multi-segment core and a cladding a triple crucible draw apparatus may be preferred.

The multiple crucible apparatus 10 illustrated in FIG. 1 includes three (3) crucibles 12, 14, and 16. Crucible 12 is a core crucible and includes the raw materials for forming the core section of an optical fiber drawn from apparatus 10. Crucible 14 is an interior cladding crucible and includes raw materials for forming an interior cladding of the fiber. In the embodiment shown, the interior cladding is adjacent core crucible 12, however, the invention is not limited to crucible 14 being adjacent crucible 12. In alternate embodiments of the invention more than just crucible 12 may be located inside crucible 14. Crucible 16 is an exterior cladding crucible. Crucible 14 is located inside crucible 16. The invention is also not limited to crucibles 14 and 16 being aligned adjacent to one another. Additional crucibles may be disposed between crucibles 14 and 16.

Crucibles 12, 14, and 16 may be made of any material with sufficient heat resistance for the given core and cladding raw materials. Preferable raw materials are disclosed in WO 99/51537, U.S. patent application Ser. No. 09/288,454, filed on Apr. 4, 1999, and U.S. patent application Ser. No. 09/499,010, filed Feb. 4, 2000, the specifications of which are incorporated herein by reference in its entirety. Each composition of glass disclosed is a composition for a soft glass. In relative terms, a soft glass is a glass with a strain point that is equal to or less than the strain point of a soda-lime glass (approximately 420 to 470° C.). Glasses with a strain point above that of soda lime glass can be considered a hard glass. The glass compositions disclosed in the referenced applications are compositions of antimony oxide glass, a.k.a. antimony silicate glass. The glass compositions disclosed may be drawn into a core, a cladding, or any other glass layer of an optical fiber drawn from a multiple crucible apparatus. The present invention is not limited to the raw materials cited in the referenced patent applications. In a preferred embodiment, crucible 12, 14, and 16 should be able to withstand a temperature of at least 1500° C. Preferably the crucibles 12, 14, and 16 are made from fused silica. Preferably, the crucibles may be constructed from any material that will not react with the glass raw materials. Examples of other suitable types of crucible raw materials include quartz or platinum.

Figure 2:
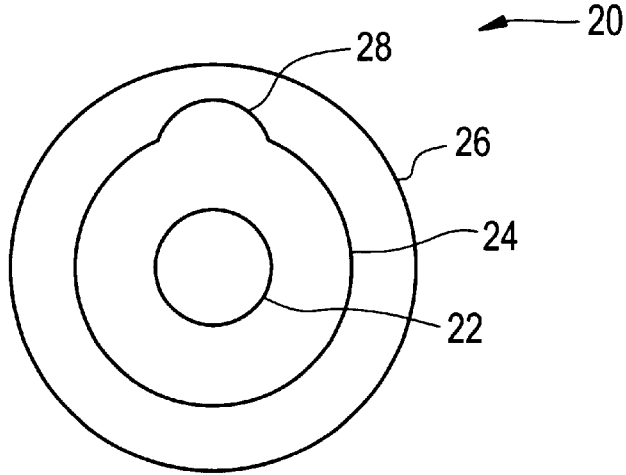
FIG. 2 is an end view of the orficies of a multiple crucible apparatus that may be used to practice the invention.

Each crucible 12, 14, and 16 has a tip with an orifice 22, 24, and 26, respectively. The preferred taper, of the tips is about 30 to about 45 degrees with respect to the axial centerline of the respective crucible. A preferred starting position for crucibles 12, 14, and 16 may be for crucibles 12, 14, and 16 have a common axial centerline. However, experience may teach that aligning crucibles 12, 14, and 16 along a common centerline may not be a preferred starting point for a particular combination of raw materials or for a particular multiple draw apparatus. An end view of orifices 22, 24, and 26 is illustrated in FIG. 2. Illustrated in FIG. 2 is a relationship among orifices 22, 24, and 26. Preferably the orifices are aligned such that a fiber having a concentric core and cladding is drawn from apparatus 10. More preferred is that the core, interior cladding, and exterior cladding are all concentric to one another.

A PK bench 2500 from Photon Kinetics, of Beaverton, Oreg., may be used to determine the concentricity of the fiber. Preferably, the core is concentric to the cladding when the core is within about 0.5 $\mu$m or less of the center of the cladding, preferably within about 0.4 $\mu$m or less, more preferably within about 0.3 $\mu$m or less, and even more preferably within about 0.2 $\mu$m or less.

At least one of the orifices includes an orientation element. As shown, in FIG. 2, orifice 24 includes an orientation element 28. Element 28 may also be known as an asymmetric feature of orifice 24. However, the invention is not limited to orifice 24 including orientation element 28. Orientation element 28 may be included in anyone of orifices 22, 24, 26, and combinations thereof. Preferably, orientation element 28 is included in an orifice for forming an internal section of the fiber. In one embodiment of orifice 24, element 28 comprises a notch. Preferably, element 28 has a depth of about 0.3 to about 1.5 mm, more preferably about 1.0 mm. In addition to a notch, element 28 may be a circumferential orientation element, an asymmetric feature, a bump, or an alignment element. Preferably the inclusion of element 28 into orifice 24 will result in orifice 24 having a mirror image along a radial axis that is non-symmetrical. Element 28 is not limited to a concave shape as shown in FIG. 2. Element 28 could also have convex shape instead of a concave shape as shown in FIG. 2.

Preferably the radius of orifice 24 is at least about 5% larger at element 28 in comparison to other points along orifice 24, more preferably at least about 10%, even more preferably at least about 15%, and most preferably at least about 30%. Correspondingly, it is preferred that the a diameter measurement of orifice 24 that includes element 28 is at least about 10% larger than a diameter of orifice 24 that does not include element 28, more preferably at least about 15%, even more preferably at least about 20%, and most preferably at least about 30%.

In an embodiment of orifice 24, it is preferred that the aspect ratio of orifice 24 is greater than 1:1. Examples of suitable orifice ratios include no more than about 1.3:1, no more than about 1.5:1, and no more than about 1.7:1. Preferably the aspect ratio is no more than about 3:1, more preferably no more than about 2:1.

Element 28 may be formed by various techniques such as grinding, machining, core drilling, water jet cutting, etching, lapping, abrasives. Grinding as used above includes at least a process in which a grinding wheel, belt, cylinder, or stone having small abrasive particles imbedded therein is used to accomplish material removal. Element 28 can be formed by contacting a an inner surface of orifice 24 with one of the above grinding devices.

Water jet cutting comprises contacting an inner surface of orifice 24 with water alone or water with abrasives to form element 28. Water jet cutting includes forcing ultrahigh pressure water (e.g. up to about 55,000 psi) through a small nozzle, e.g. as small as 0.004" in diameter or 0.005"×0.16", thereby generating a high-velocity water jet. The water leaving the nozzle may travel at a rate of speed as fast as three times the speed of sound. The water jet leaving the nozzle is a controllable cutting stream. The cutting stream is directed toward the inner surface of orifice 24 to cut away the necessary material to form element 28.

In laser cutting a highly coherent, focused beam of light is used as a drill bit. The beam of light is used to heat an inner surface of orifice 24 to above its softening point and vaporize the material necessary to form element 28.

Core drilling is similar to grinding in that a grinding wheel is attached to a drill as a drill bit. The grinding wheel attached to the drill is used to remove the necessary material from orifice 24 to form element 28.

The apparatus 10 may also include a furnace not shown. The furnace is not required to practice the present invention. A suitable furnace that may be used in accordance with the invention is disclosed in U.S. patent application Ser. No. 09/477,599, filed Dec. 30, 1999, by Trentelman, the specification of which is incorporated herein by reference in its entirety. However, the invention is not limited the aforementioned furnace.

Figure 3:
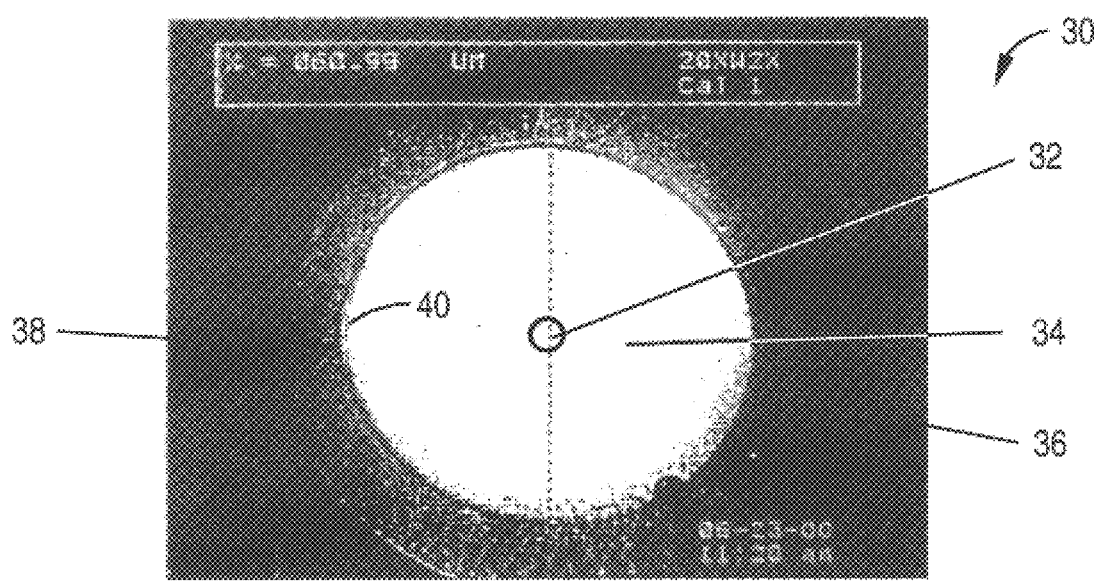
FIG. 3 is a radial cross sectional view of a fiber made in accordance with the invention.

A radial cross section of a fiber that can be drawn for apparatus 10 is depicted in FIG. 3. The fiber 30 has a core 32, interior cladding 34, and an exterior cladding 36. Preferably cladding 34 includes an orientation element 38. Alternatively, element 38 may be in core 32 or another section of fiber 30 instead of cladding 34. Preferably, fiber 30 has only one element 38, however, the invention is not limited to only one section of fiber 30 having only one element 38. It is also preferred that element 38 is located in an interior section of fiber 30, however, the invention may be still be practiced with element 38 located in the outermost exterior section of fiber 30. The orientation element may also be referred to as a bump or a circumferential orientation segment. As shown in FIG. 3, element 38 is an atypical segment of the circumference of cladding 34. A standard path of the circumference of cladding 34 is illustrated as dashed line 40. Preferably, element 38 deviates from line 40 in a concave or convex manner. In one embodiment, preferably element 38 has a depth of at least about 0.5 μm, more preferably about 1 μm. As a result of cladding 34 including element 38, cladding 34 may have the same aspect ratio as orifice 24 mentioned above. Also, the radii of cladding 34 may have the same relationship to each other as does the radii of the orifice 24. The aforementioned relationships of radii, diameter, and aspect ratio regarding orifice 24 also apply to cladding 34 and are incorporated herein by reference.

However, the invention is not limited to cladding 34 having an element 38 with a concave shape. The element 38 may also have a convex shape. For example, element 38 may be in the shape of a dip, cutout, notch, or some other type of atypical segment in the circumference of cladding 34. Element 38 is not limited to any particular shape. If element 38 is in the shape of a notch, element 28 would be in the shape of a bump. Whatever shape is desired for element 38, element 28 should be the complimentary shape of element 38.

As for fiber 30, preferably element 38 extends along an entire axial length of the fiber. It is also preferred that core 32 is symmetrical and concentrically located within cladding 34, and more preferred within both claddings 34 and 36. It is further preferred that cladding 36 is symmetrical. Symmetrical is used above, with respect to core 32 and cladding 36 to indicate that the mirror images taken along a diametric axis of a cross section of the fiber would have the same dimensions. Several methods may be used to draw fiber 30 from apparatus 10, in accordance with the invention. One of the methods includes a method of making an optical fiber. The method includes drawing an optical fiber from multiple crucible apparatus 10, wherein one of the crucibles, e.g. crucible 14, of apparatus 10 has a tip with a non-symmetrical orifice 24. As shown in FIGS. 1 and 2, crucible 14 may be used for forming a cladding portion of the fiber.

Another embodiment of the methods that may be used to practice the invention includes a method of making an optical fiber from multiple crucible apparatus 10. This second embodiment includes the step of documenting the location in space of at least one alignment element (28) of an orifice (28) of at least one of the crucibles (14) of the multiple crucible apparatus (10). In this step, the location of element 28 with respect to a reference point is recorded. Preferably, if the location of crucible 12 is altered, an operator of apparatus 10 will know if crucible 12 is being moved away from or closer toward element 28.

Figure 4:
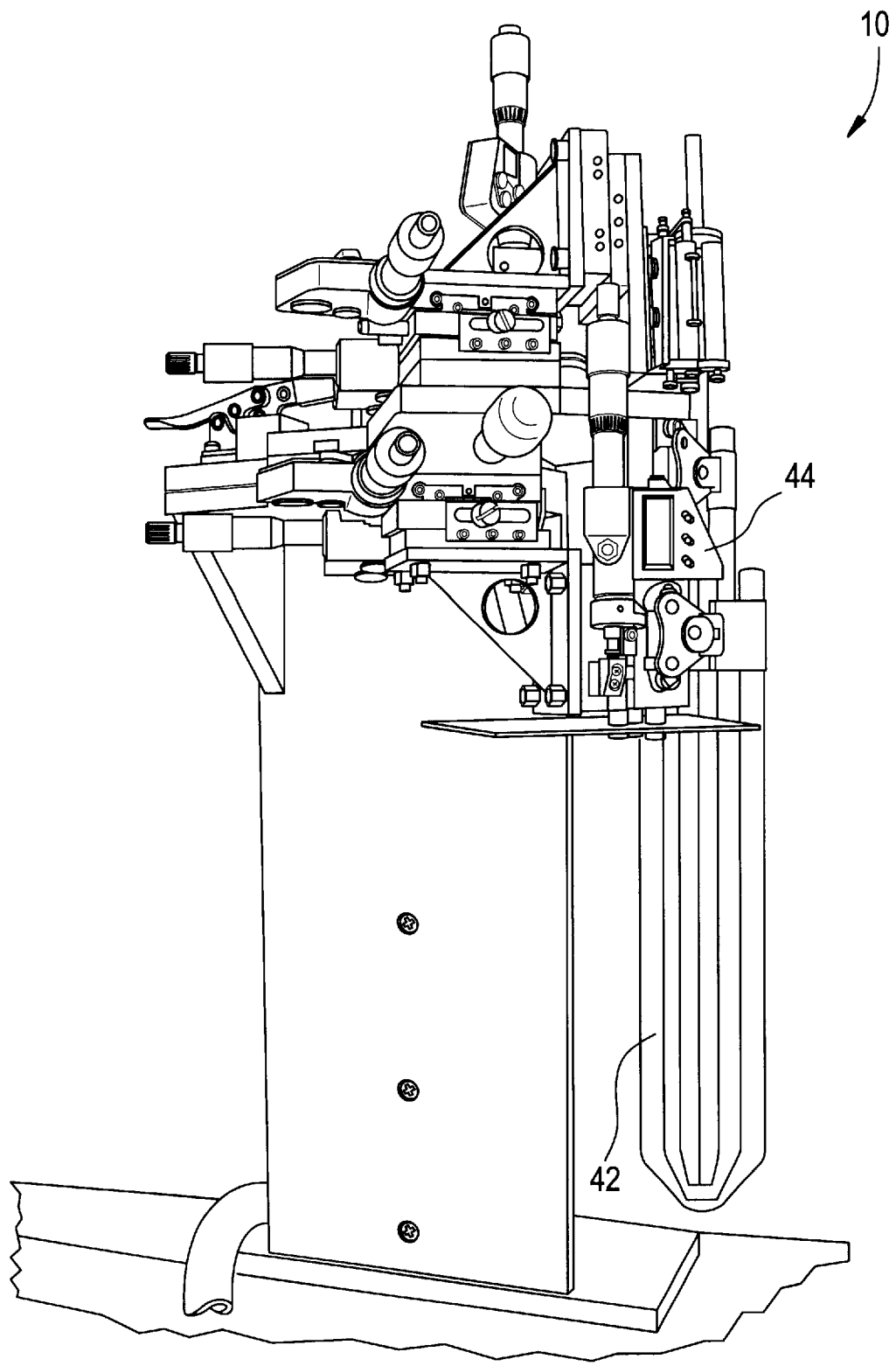
FIG. 4 is a side elevation view of a triple crucible apparatus.

In space as used herein includes, at least the following, orientation technique to define the position of element 28 relative to a reference point. Examples of suitable reference points include a support 42 of the apparatus 10 as shown in FIG. 4. For example, the location of element 28 may be documented in space as the side of crucible 14 facing support 42. Conversely, the location in space of element 28 may be documented as on the side of crucible 14 opposed to support 42. In another embodiment of the aforementioned method of the invention, the location of element 28 in space may be located relative to crucible 12. For example, element 28 could be in front of crucible 12, behind crucible 12, right of crucible 12, or left of crucible 12. The location of element 28 in space is not limited to only the reference points of crucible 12 or support 42. A further embodiment includes positioning element 28 relative to a "V" groove retaining member for a retaining element of support 42. Element 44 of support 42 supports a respective crucible relative to support 42 and the other crucibles. Element 44 may include a "V" groove retaining member. An open end of the crucible is inserted into the member and the member will retain a lip of the open end. Another technique to locate element 28 in space could be to align crucible 14 in the member such that the side of crucible 14 which includes element 28 is adjacent the base of the member. Any convenient reference point may be used to document the location of element 28 in space.

In one embodiment of this method of the invention, element 28 is located between core crucible 12 and support 42 for the multiple crucible apparatus. In this embodiment of the invention, the operator of apparatus 10 would know if moving the core required to move crucible 12 closer to element 28, the operator should move crucible 12 closer to the supports for apparatus 10. For additional information regarding how crucible 12 may be moved, U.S. patent application Ser. No., 09/654,549, filed on or about Sep. 1, 2000, is incorporated herein by reference in its entirety.

The method further includes drawing an optical fiber from multiple crucible 10. Preferably the method further includes the step of documenting a location of core 32 of the drawn fiber with respect to cladding 34, cladding 34 having a substantially circular cross section and orientation element 38. The location of core 32 may documented in the same manner as described in U.S. patent application Ser. No. 09/654,549, previously incorporated by reference, with respect to the use of a cross section of the fiber and imaging systems such as a Boeckler Instrument VIA-170. The imaging system may superimpose a Cartesian set of coordinates on the image of the cross section of the fiber. In a preferred use of the imagining system, the Cartesian coordinates are superimposed on the cross section such that the origin of the coordinates is at the center of the section of fiber which includes orientation element 38. Preferably orientation element 28 is aligned in the fiber to lie along the negative x-axis of the set of coordinates. It is also preferred that the coordinates are graduated which provides a measurement device for guidance regarding the magnitude of the movement of at least one crucible to concentrically align the sections of the fiber. Alignment element 38 and the set of coordinates provide the necessary information regarding the direction of the next move.

The invention is not limited to locating core 32 relative to cladding 34. The invention is also applicable to locating cladding 36 relative to cladding 34. Any section of a fiber may be located relative to another section of fiber which includes the orientation element 38.

The method may additionally include the step of moving core crucible 12 relative to outer crucible 14 having the at least element 28. Information regarding how crucible 12 may be moved relative to crucible 14 is discussed in the aforementioned U.S. patent application Ser. No. 09/654,549. Preferably the steps of drawing, documenting the location of core 32, and moving are repeated until a location of core 32 comprises a pre-determined location relative to cladding 34 having a substantially circular cross section with orientation element 38. Preferably, the pre-determined location comprises a center of cladding 34 having the substantially circular cross section and orientation element 38.

The invention is not limited to centering core 32 relative to cladding 34. The invention could likewise be used to center cladding 36 relative to cladding 34. Another method that may be used to make fiber 30 includes the step of drawing optical fiber 30 from multiple crucible apparatus 10 wherein one of the crucibles (14) of apparatus 10 has a circumferential orientation element 28. This method also includes the step of documenting a location of core 32 of the drawn fiber 30 and moving a location of core crucible 12 of apparatus 10 relative to crucible 14 having circumferential orientation element 28. The above steps of drawing, documenting the location of core 32, and moving are repeated until core 32 of fiber 30 is located at a pre-determined location. The pre-determined location may comprise a center of interior cladding 34 of fiber 30. In this method of the invention circumferential orientation element 28 may be used to locate core 32 relative to cladding 34 of fiber 30. The invention is not limited to moving crucible 12 relative to crucible 14 to center core 32 relative to cladding 34. The invention also could be practiced by moving crucible 16 relative to crucible 14 to center cladding 36 relative to cladding 34.

Additional method steps that may be incorporated into any one of the above methods include a drawing step which further comprises a mass flow rate of raw material into the apparatus comprises substantially the same as a mass flow rate of fiber being removed from the apparatus. Another optional step is that said moving step may comprise adjusting the location of the core crucible along a first axis to determine a center of the fiber along the first axis. The moving step may optionally further comprise moving the core crucible by adjusting the core crucible along a second axis to determine a center of the fiber along the second axis. Preferably the first axis intersects the second axis.

The above methods of the invention may also include the additional steps of (1) measuring a core offset from the desired point and then making at least one further move along a first axis, (2) determining a point on the axis when the core offset comprises a minimum, (3) determining a point on the axis where the core offset comprises a minimum and a point on a second axis where the core offset comprises a minimum, and combinations thereof.

One embodiment of crucible 14 that may be used to practice any one of the aforementioned methods of the invention orifice 24 of outer crucible 14 has an alignment element 28 having an aspect ratio which comprises less than about 2:1 and greater than 1:1. Preferably in this embodiment, element 28 has a depth of no more than about 1 mm.

Any of the aforementioned methods of the invention can be used to make a fiber having an interior cladding with an aspect ratio of less than about 2:1 and greater than 1:1. Also, element 38 may comprise only a segment of the circumference of a cross section of cladding 34.

Figure 5:
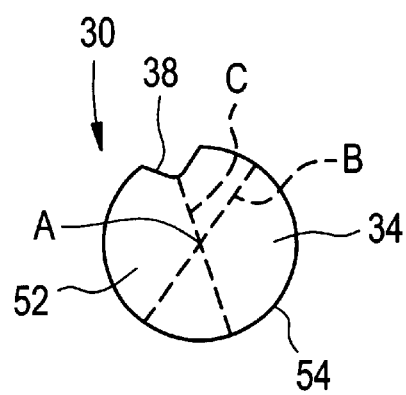
FIG. 5 is a cross sectional view of a fiber made in accordance with the invention.

A cross section of a fiber made in accordance with the invention is shown in FIG. 5. Cladding 34 may have element 38 in the form of a notch or any other type of convex shape. Cladding 34 of FIG. 5 includes a center point A and the cross section is divided into to two halves 52 and 54 along line B. Preferably line B is a diameter of the cross section of fiber 30. Preferably halves 52 and 54 are not symmetrical mirror images of one another. Fiber 30 may have more than one diametric line B. More preferably fiber 30 may also have a second diameter C in which the two halves of fiber 30 do form symmetrical mirror images of each other. Most preferably, fiber 30 only has one diametric line C in which the halves of the cross section are symmetrical to one another.

One advantageous uses of the above methods is to incorporate them into the methods disclosed in U.S. patent application Ser. No. 09/654549, which was previously incorporated herein by reference in its entirety.

EXAMPLES

The invention will be further clarified by the following examples which are intended to be exemplary of the invention.

Example 1

In this example fiber was drawn from a triple crucible apparatus and centering of the core to the fiber outer diameter and an interior cladding to the outer fiber diameter was achieved to a level of less than 0.5 micron offset. In this example both the outer diameter of the fiber and the core of the fiber were centered relative to the interior cladding of the fiber. This resulted in all three sections of the fiber being concentric to each other within about o.5 $\mu$m. The following steps were employed to center the core and interior cladding relative to the outer diameter of the fiber.

The crucibles of a triple crucible apparatus were mounted in a fixture as described in U.S. patent application Ser. No. 09/654,549. The middle crucible had in its inner diameter and at the tip a ground groove 1 mm wide and 0.5 mm deep.

The identifying groove in the middle crucible was mounted rotationally closest to the draw tower. This aligned the feature with the y-axis of the stages by which the inner and outer crucibles were moved, thereby fixing the middle crucible in space. Thus y-axis moves of either the outer or inner crucibles would move them correspondingly positive (+) or negative (−) along the y-axis.

The crucibles were charged with a glass composition disclosed in patent application WO 99/51537 and heated to an appropriate temperature to soften the glass and initiate flow from the orifices (about 1400 C.). A steady state process was achieved for drawing fiber of about 125 micron diameter.

The fiber was drawn and initially examined in cross section with a Boeckler Instrument VIA-170 imagining system as disclosed in U.S. patent application Ser. No. 09/654,549 and above. The identifying feature in the middle crucible was found to create a corresponding feature in the fiber cross section that was relatively smaller, but still discernible. The interior cladding was observed to be about 6 microns offset from the fiber outer diameter and the circumferential location of the offset, as determined by its relation to the feature at the interior cladding/exterior cladding interface, was found to be in the negative (−) y direction (toward the draw tower).

Knowing that the feature in the fiber was aligned to the draw tower and the y-axis, the position of the exterior cladding crucible (the outer most crucible of the triple crucible apparatus) was adjusted along the y-axis by physically moving the outer crucible toward the draw tower and with respect to the fixed middle crucible some prescribed, arbitrary amount. (In this case, about 0.5 mm was distance of the initial move).

The process was allowed to reachieve equilibrium, about 3 minutes at a draw rate of about 12 m/min. This allowed the fiber cross section to appropriately reflect the change in crucible positions.

A second cross section of the fiber was again checked, as described above, and the cladding was found to be about 3 microns offset from the center, and again was offset in the negative y direction, toward the draw tower. The outer crucible was again physically moved along the y-axis an amount equal to the first move (about 0.5 mm).

The interior cladding was found to be within about 0.5 micron offset of center upon subsequent checking of the fiber. At this time the core location was also checked and found to be about 8 microns offset from center, about 7 microns in the negative (−) x direction and about 4 microns in the negative (−)y direction.

Based on the moves and measured responses observed in the above interior cladding centering, the core crucible was moved about 1.16 mm in the positive direction along the x-axis and about 0.67 mm in the positive direction along the y-axis. The process was allowed to again reach equilibrium.

Sampling of the fiber, as described above, showed the core to be offset by about 0.8 micron in the positive x direction. The inner crucible was moved about 0.1 mm in the negative direction along the x-axis and the process was allowed to reach equilibrium.

Inspection of the fiber showed the core to be within about 0.5 microns of the fiber center. It was also found that the interior cladding/exterior cladding alignment had not changed during the core centering phase of the process.

Thus by exploiting the fact that offset could be determined relative to the x-axis and the y-axis, using the feature in the fiber that related back to the crucible feature, the exterior cladding, interior cladding, and core could all be centered in a timely and efficient manner.

It will be apparent to those skilled in the art that various modifications and variations can be made to the present invention without departing from the spirit and scope of the invention. Thus, it is intended that the present invention covers the modifications and variations of this invention provided they come within the scope of the appended claims and their equivalents.

What is claimed is:

1. A method of making an optical fiber from a multiple crucible apparatus, said method comprising:
   (a) documenting the location in space of at least an alignment element of an orifice of at least one of the crucibles of the multiple crucible apparatus;
   (b) drawing an optical fiber from the multiple crucible;
   (c) documenting a location of a first portion of the drawn fiber with respect to a second portion of the drawn fiber, the second portion of the drawn fiber having an orientation element;
   (d) moving the a crucible containing the raw materials for the first portion of the drawn fiber relative to the crucible having alignment element; and
   (e) repeating steps (b)–(d) until a location of the first portion comprises a pre-determined location relative to the second portion having the orientation element.

2. The method of claim 1, wherein an aspect ratio of the orifice having the alignment element comprises less than about 2:1 and greater than 1:1.

3. The method of claim 1 wherein the orientation element of the fiber has a depth of no more than about 1 $\mu$m.

4. The method of claim 1 wherein the pre-determined location comprises a center of the cladding of the fiber.

5. The method according to claim 1 wherein the crucible having the orifice with the alignment element comprises a crucible for a cladding section of the fiber.

6. The method according to claim 1 wherein the first portion of the fiber comprises a core of the fiber.

7. The method according to claim 1 wherein the alignment element comprises an asymmetric feature in the orifice.

8. The method of claim 1 further comprising measuring a core offset from the pre-determined location and then making at least one further move along a first axis.

9. The method of claim 8 further comprising determining a point on the axis when the core offset comprises a minimum.

10. The method of claim 8 further comprising determining a point on the axis where the core offset comprises a minimum and point on a second axis where the core offset comprises a minimum.

11. A method of making an optical fiber from a multiple crucible, said method comprising:
   (a) drawing an optical fiber from a multiple crucible apparatus wherein one of the crucibles of the apparatus has a circumferential orientation element;
   (b) documenting a location of a first portion of the drawn fiber;
   (c) moving a location of a second crucible of the apparatus relative to the crucible having the circumferential orientation element; and
   (d) repeating steps (a)–(c) until the first portion of the fiber is located at a pre-determined location.

12. The method of claim 11 wherein the pre-determined location comprises a center of a cladding of the fiber.

13. The method of claim 12 wherein a cross section of the cladding comprises a circumferential orientation segment.

14. The method of claim 11 wherein the circumferential orientation element of the crucible comprises an orifice having an aspect ratio of less than about 2:1 and greater than 1:1.

15. The method according to claim 11 wherein said documenting comprises determining a location of the first portion of the fiber relative to the circumferential orientation element.

16. The method of claim 11 wherein said drawing occurs while the mass flow rate of raw material into the apparatus comprises substantially the same as the mass flow rate of fiber being removed from the apparatus.

17. The method of claim 11 wherein the circumferential orientation element locates a core of the fiber relative to a cladding of the fiber.

18. A method of making an optical fiber from a multiple crucible, said method comprising:
   (a) drawing an optical fiber from a multiple crucible apparatus wherein one of the crucibles of the apparatus has an orifice having a notch;
   (b) documenting a location of a first portion of the drawn fiber;
   (c) moving a location of a crucible for the first portion of the fiber of the apparatus relative to the crucible having the notch; and
   (d) repeating steps (a)–(c) until the core of the fiber is located at a predetermined location.

19. The method of claim 1 wherein said drawing occurs while the mass flow rate of raw material into the apparatus comprises substantially the same as the mass flow rate of fiber exiting from the apparatus.

20. The method of claim 1 wherein said moving the crucible containing the raw materials for the first portion of the drawn fiber comprises adjusting the location of the crucible containing the raw materials for the first portion of the drawn fiber along a first axis to determine a center of the fiber along the first axis.

21. The method of claim 20 further comprising moving the crucible containing the raw materials for the first portion of the drawn fiber by adjusting the crucible containing the raw materials for the first portion of the drawn fiber along a second axis to determine a center of the fiber along the second axis.

22. The method of claim 21 wherein the first axis intersects the second axis.

23. A method of making an optical fiber comprising
   Drawing an optical fiber from a multiple crucible apparatus, wherein one of the crucibles of the apparatus has a non-symmetrical orifice.

24. The method of claim 23 wherein the crucible comprises a crucible for forming a cladding of the fiber.

* * * * *